UNITED STATES PATENT OFFICE.

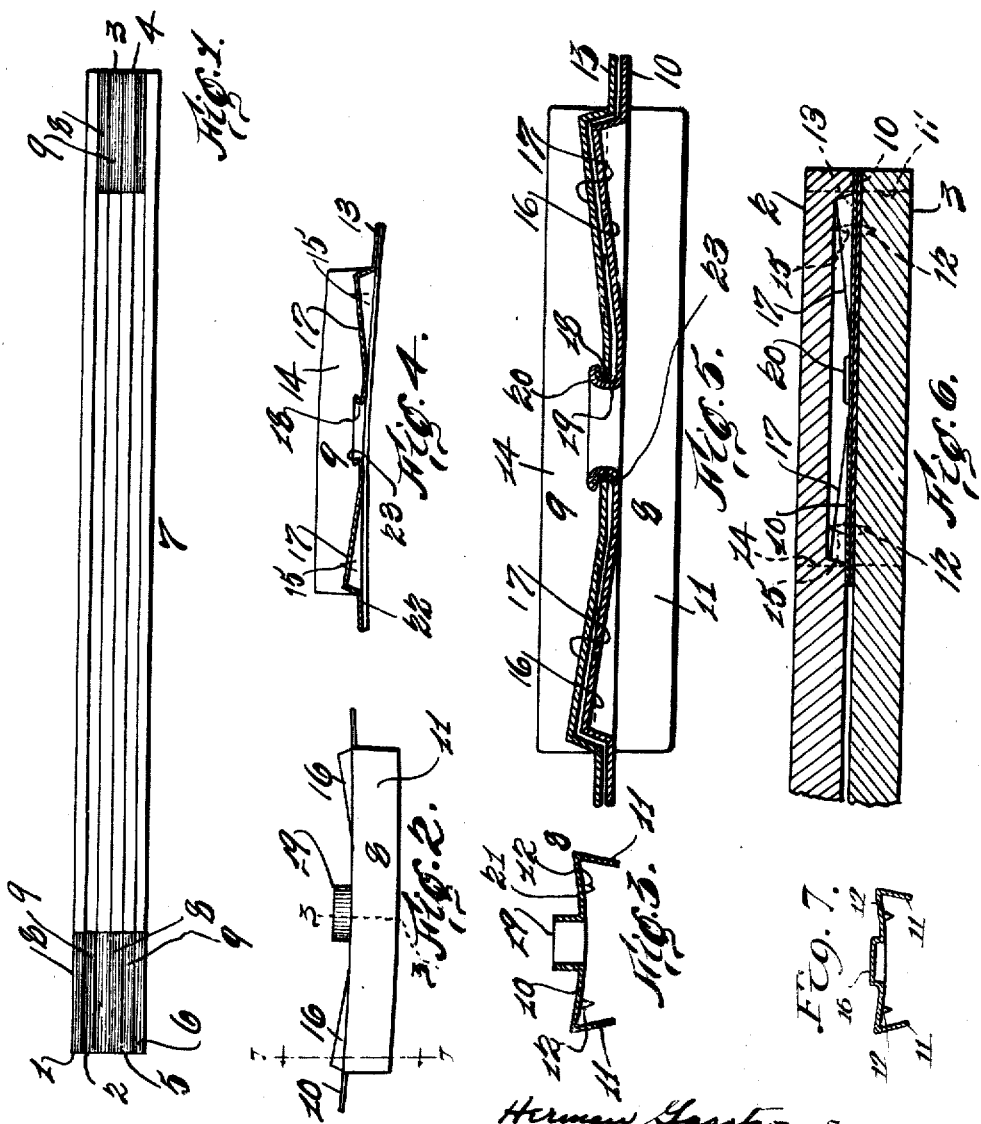

HERMAN GASSTROM AND JOHN A. BENSON, OF NEW YORK, N. Y.

EXTENSION-RULE.

1,293,079.

Specification of Letters Patent.

Patented Feb. 4, 1919.

Application filed July 22, 1916. Serial No. 110,683.

*To all whom it may concern:*

Be it known that we, HERMAN GASSTROM and JOHN A. BENSON, a subject of the Czar of Russia and a citizen of the United States, respectively, residing at New York city, county and State of New York, have invented certain new and useful Improvements in Extension-Rules, of which the following is a full, clear, and exact description.

This invention relates to improvements in extension rules, one of the objects being to provide such a rule which will, when extended, be perfectly rigid and not liable to prematurely fold up.

To carry our invention into practice, we provide pivotally connected plates which are attached to the rule sections or members, the said plates being constructed so as to bind one against the other to provide a frictional resistance, certain means being employed to lock the rule sections while extended or folded.

The chief object of our invention is to provide means to connect the members of an extension rule, said means being arranged to lock said rule sections while extended or folded without resorting to springs or any yieldable device, other than the connecting members themselves, to produce frictional resistance.

Our improved connection for sectional rule members constitutes an exceedingly cheap but efficient means for pivotally connecting the members of an extension rule, as but two elements are required, one on each rule section.

In the drawing—

Figure 1 illustrates a side elevation of an extension rule provided with our improvement;

Fig. 2 is an enlarged side view of one of the connecting members;

Fig. 3 is a cross-sectional view thereof the section being taken on a line 3—3 in Fig. 2;

Fig. 4 is a longitudinal sectional view of the other connecting member;

Fig. 5 is an enlarged longitudinal view of the connecting members assembled;—

Fig. 6 is a similar view showing a portion of two of the rule members having the connecting members applied thereto;

Fig. 7 is a cross sectional view taken on a line 7—7 in Fig. 2.

In Fig. 1, the numerals 1, 2, 3, 4, 5, and 6 indicate the members of an extensible rule 7 arranged to be extended by turning the members thereof one on another in a circular direction, the connecting members indicated by 8 and 9 being arranged for such movement.

As one of the objects of our invention is to obviate the necessity of the employment of springs, or equivalent elements, we construct, or form, the members 8 and 9 in a manner to provide the necessary binding effect when said members 8 and 9 are connected.

As far as we are aware, it has been the custom to provide rule sections with flat plates and also to employ a spring to provide the necessary resistance to the movement of the sections of the rule.

Instead of employing flat plates, we utilize a convexed plate 8 and a convexed plate 9 suitably connected for pivotal movement. As can be seen in Figs. 2 and 3, one of said plates is concaved and the other convexed on their adjoining surfaces. The connecting member 8 consists of a plate 10 concaved longitudinally and transversely, said plate carrying flanges 11 and piercing points or fasteners 12.

As can be seen in Fig. 4, the fastening plate 9 consists of a convexed plate 13 having flanges 14 and piercing points or fasteners 15. The plate 13 is convexed transversely thereof.

The plates 10 and 13 are provided with locking elements arranged to interlock when the sections of the rule are extended or folded.

The locking elements referred to are struck up from the material of the plate as indicated at 16 and 17 in Figs. 2 and 4 respectively, hence when the plates are connected, as shown in Fig. 5, the struck up portions 17 become pockets for the struck up portions 16 which constitute projections.

To pivotally secure the plates 10 and 13 together, we provide the plate 13 with an opening 18 to receive a struck up flange 19 on the plate 10 which when turned over at 20, Fig. 5, forms a pivotal connection for the plates 10 and 13.

When the plates are placed together, face to face, the numeral 21 indicating the face of the plate 10, and the numeral 22 the face of the plate 13, the ends of said plates will touch, the central portions being separated, but the flange 19 will extend through the opening 18. When the flange 19 is turned over to form a flange 20, the plates will be drawn toward one another, thereby causing said plates to flatten to some extent, both longitudinally and transversely; thereby placing said plates under tension, said tension tending to force said plates apart in the manner of an inserted spring.

When the plates are assembled, the struck up portions 16 will be inserted into the pockets 17. When the plates are rotated, one upon the other, the pockets 17 and struck up portions 16 will separate causing the plates 10 and 13 to yield slightly. As the opening 18, in the plate 13, is surrounded by a beading 23, there will be at all times after the plates are secured together a slight space to permit of the yielding of said plates under circumstances above set forth. Fig. 5 illustrates the plates 10 and 13 after they have been assembled.

The rule sections are placed between the flanges of the connecting plates, the piercing points 12 and 15 being forced into the wood as shown in Fig. 6.

By constructing and connecting the plates as above described, we are able to provide a pivotal connection for extensible rule sections having all the advantages of connections employing a spring but none of the disadvantages. Furthermore, we are able to manufacture our improved connection far cheaper than if springs were employed. The plates of our connection are formed in a manner to provide a spring action when said plates are secured together.

A still further advantage resides in the fact that it is necessary to recess a rule member in one face only, as shown in Fig. 6. In other words, that portion of a rule member which carries the plate 9 is the only one that is recessed, hence the rule is not weakened by being recessed in both faces.

We claim as our invention:

1. A connection for the members of an extension rule, consisting of two plates, one of said plates being provided with an opening, an annular shoulder carried by the other plate arranged to pass through such opening, and to be turned over to form a pivotal connection, said plates being shaped to exert pressure against each other when assembled 2. A connection for the members of an extension rule consisting of a plate concaved longitudinally and transversely thereof, said plate being provided with pockets intermediate the side edges thereof, a second plate concaved longitudinally and transversely thereof, projections carried by the last named plate to engage the pockets in the first named plate, and means to pivotally secure the plates together.

3. A connection for the members of an extension rule consisting of a plate concaved longitudinally and transversely thereof, said plate being provided with pockets intermediate the side edges thereof, a second plate concaved longitudinally and transversely thereof, projections carried by the last named plate to engage the pockets in the first named plate, means to pivotally connect the plates together, and flanges carried by said plates to engage the members of the rule.

Signed at the city of New York, N. Y., this 12th day of July, one thousand nine hundred and sixteen.

HERMAN GASSTROM.
JOHN A. BENSON.

Witnesses:
ROBERT C. RICHTER,
FRED F. WEISS.